Feb. 16, 1954 H. T. JENSEN ET AL 2,669,120
ROTOR BALANCING MEANS AND METHOD
Filed Aug. 2, 1946 2 Sheets-Sheet 1
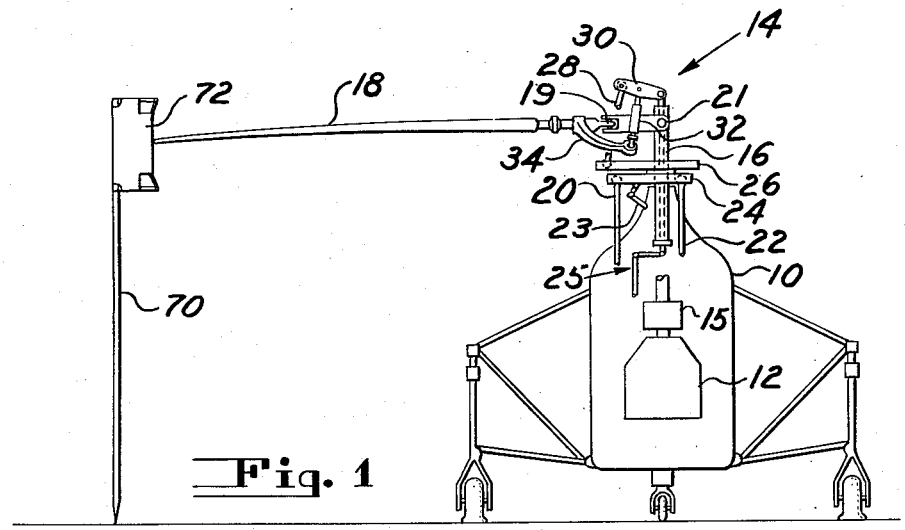
Fig. 1
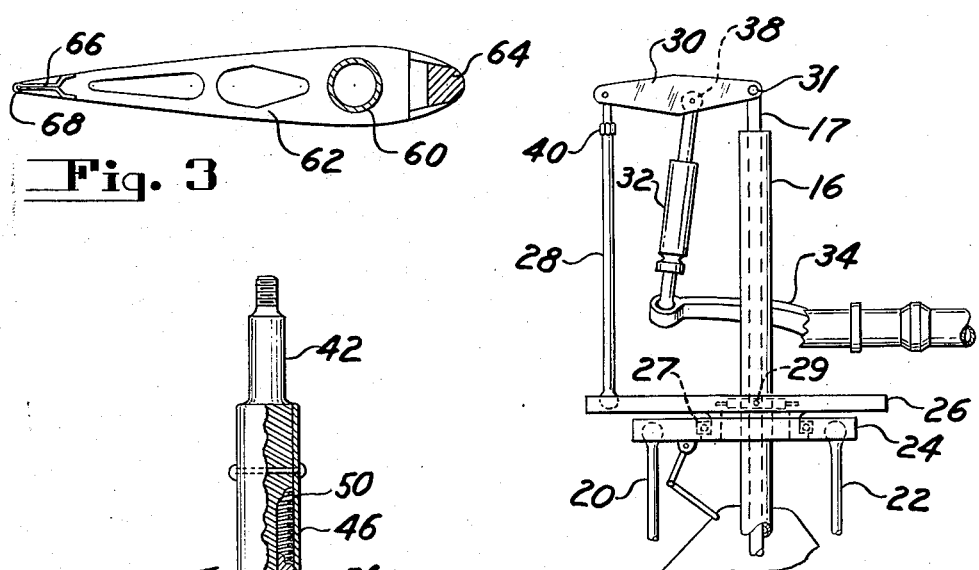
Fig. 2
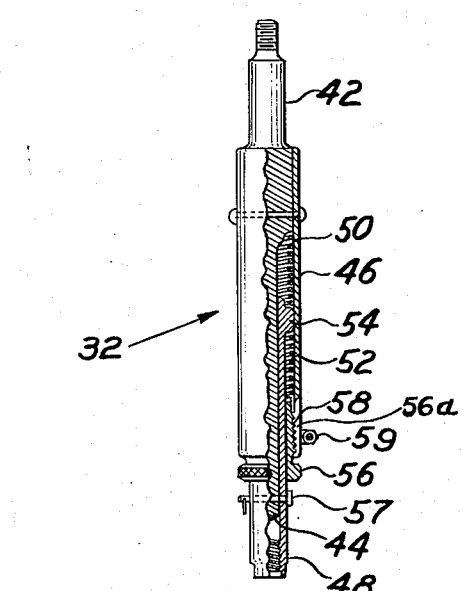
Fig. 3
Fig. 4
H. T. JENSEN
H. W. BONNETT
INVENTORS
BY Charles L. Shelton
ATTORNEY Feb. 16, 1954  H. T. JENSEN ET AL  2,669,120
ROTOR BALANCING MEANS AND METHOD
Filed Aug. 2, 1946  2 Sheets-Sheet 2
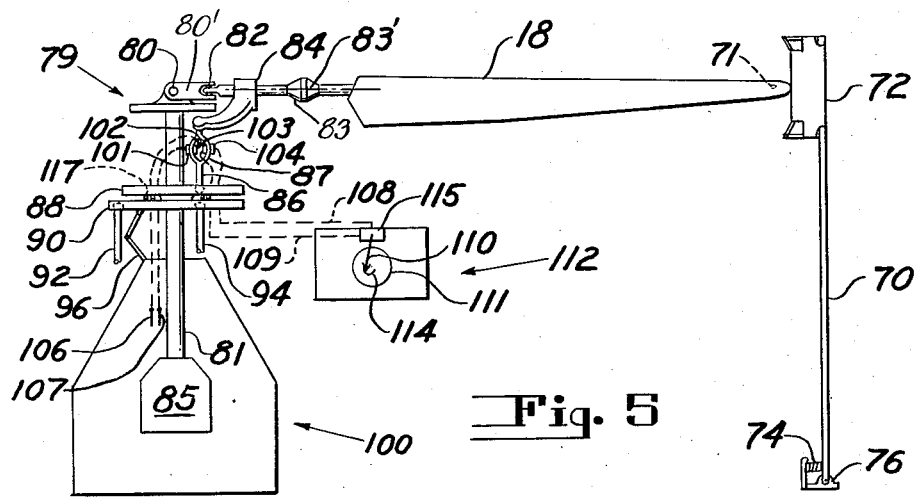
Fig. 5
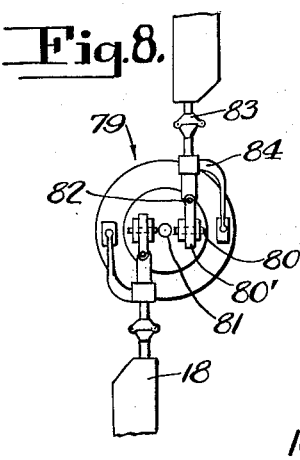
Fig. 8.
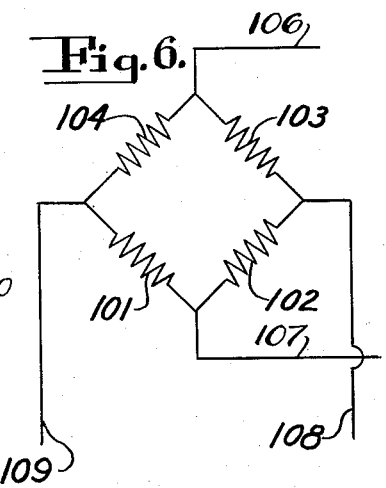
Fig. 6.
Fig. 5a.
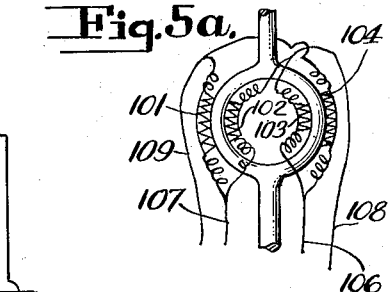
Fig. 8a.
Fig. 7
H. T. JENSEN
H. W. BONNETT
INVENTORS
BY Charles L. Shelton
ATTORNEY Patented Feb. 16, 1954

2,669,120

UNITED STATES PATENT OFFICE 2,669,120

ROTOR BALANCING MEANS AND METHOD

Harry T. Jensen, Milford, and Horace W. Bonnett, Fairfield, Conn., assignors to United Aircraft Corporation, East Hartford, Conn., a corporation of Delaware Application August 2, 1946, Serial No. 688,146

8 Claims. (Cl. 73—147)

1

This invention relates generally to direct lift aircraft having supporting rotors which may be power driven, and more particularly to a means and method for balancing the rotor blades of such craft.

An object of this invention is to provide a device which will permit reasonably accurate balancing of the pitching moments of the rotor blades without the use of any elaborate electrical or magnetic instrumentation, and is particularly adapted for use in places where these are not available, such as in general field operations away from the manufacturer's test stands.

Another object is to provide a device, and method for using the same, whereby accurate balancing of the blades may be obtained in their manufacture, so that interchangeability between production blades is possible.

Other objects and advantages will be apparent from the specification and claims and from the accompanying drawings which illustrate what is now considered to be a preferred embodiment of the invention.

In the drawings,

Fig. 1 is a schematic view showing a direct lift aircraft having a rotor provided with the balancing device of this invention, and showing the position of the tip of one blade being measured with respect to the ground;

Fig. 2 is a schematic side view of a typical rotor head linkage which includes both total and cyclic pitch control;

Fig. 3 is a cross section of a representative rotor blade;

Fig. 4 is an elevation view of the device per se, with parts in section;

Fig. 5 is a schematic side view of a rotor test stand mounting a single blade in combination with a fixed tracking flag;

Fig. 5a is an enlarged detail showing the proving ring of Fig. 5;

Fig. 6 is a schematic wiring diagram for the strain gauge installation by which data may be recorded;

Fig. 7 is a schematic diagram of an electrical mechanism by which total unbalance in the rotor blade system may be recorded; and Fig. 8 is a plan view of the test stand of Fig. 5 with two blades mounted thereon; and Fig. 8a is a partial section view of the blade in the vicinity of the pitch control horn.

In rotary wing aircraft utilizing a power driven rotor such as helicopters in which provision may be made for autorotation, not only must the pitch of the individual blades be set at equal angles to some normal, such as the plane perpendicular to the rotary shaft, but also the pitching moments of all the blades must be equalized.

2

In rotary wing aircraft, such as a gyro-plane, where the pitch of the blades is set on the ground and is not controllable by the pilot, balancing of the blades with regard to the pitching moments in some craft may not be essential. The moments which actually exist will be transferred into the hub and will probably be, under normal conditions, of a magnitude which will not be felt in the aircraft or the controls. However, if these moments are or become excessive they may result in a twisting of the blade structure, resulting in dissymmetry in the blade pattern and a consequent serious vibration of the whole aircraft.

In a helicopter, however, where the pitch of the blades is linked through a control system directly to the pilot's joy stick any aerodynamic unbalance of a rotor blade will be transmitted back to the controls as a resultant unbalance of all the blades, and be felt as a force tending to rotate the stick in the direction of the unbalance. This stick movement will take place at the same speed as the revolutions of the rotor.

If the blades are of normal torsional rigidity, a pitching moment unbalance which is large enough to cause severe discomfort to the pilot in operating the ship, is in many cases too small to cause a deflection in the structure of the blade, or the control system, so that the blades will apparently be in perfect track and the blade tips follow the same rotative path which may be measured by the use of a tracking flag such as is described in Patent No. 2,552,739, issued May 15, 1951, to Reon B. Roberts. Thus, it can be seen that an uncomfortable and inconvenient rotation of the stick and a vibration of the whole craft may result even though all the rotor blades seem to be in perfect rotative alignment.

In order to remedy this shortcoming our invention provides for a flexible control linkage which may be permanently interposed in any control system, and which when rendered operative by a mechanic, will allow the blade incidence to be deflected by its pitch moment force. For example, with the flexible control linkage of the invention in use, the blade with the greatest pitch decreasing moment will fly in the lowest path thus giving on a tracking flag, due to the flexibility introduced, an exaggerated indication of the magnitude and direction of the undesired pitching moment. The use of the flexible control linkage makes it much easier to read the indication of the magnitude and direction of the blade pitching moment particularly in blades which are very rigid torsionally and where the rotor might maintain good track in spite of the unbalanced or unequal pitching moments of the blades.

After the pitching moments in all the blades have been equalized the device is then rendered inoperative when the operator reinserts locking pins and the helicopter flown with vibration free controls.

The device to be described and shown in Figs. 1 to 4 preferably is for use in the field. With the present construction, when blades are damaged in ground handling or in shipment, their aerodynamic moments may easily be altered without changing their structural characteristics, thus rendering them rough in operation. As there may not be any accurate measuring instrument such as described later in this application and shown in Figs. 5 to 7, at the base of operations, the instant device may be used to give sufficiently accurate indication of unbalance so that corrective measures may be applied by any mechanic familiar with the procedure.

In the device disclosed in Figs. 1 to 4, an aircraft 10 is provided with an engine 12 driving a rotor 14 through a transmission 15 and shaft 16. The helicopter described in this application is similar to the one shown in detail in Patent No. 2,517,509, issued August 1, 1950, to I. I. Sikorsky, but the structure will improve other types of rotary wing aircraft as well. In Fig. 1, the rotor 14 includes a blade 18, of which there may be two or more in number, linked to the shaft 16 by a vertical pivot 19 and a horizontal pivot 21. The total pitch of all the blades is controllable from the pilot's compartment through a suitable linkage 25 which operates a push-pull rod 17 reciprocable internally of the drive shaft 16 so as to raise or lower a pivot 31 and consequently a pivot 38 to simultaneously increase or decrease the pitch of all the blades which are mounted on bearings (Fig. 8a) within their hubs so that they can rotate around their longitudinal axes. The cyclic pitch is operated by a control rod 20 and a control rod 22 as a result of lateral and fore and aft movements respectively of a conventional joy stick (not shown) in the pilot's compartment. These control rods tilt a plate 24 which is held by a scissors 23 that permits tilting but prevents rotation. Plate 24 is connected by suitable bearings 27 to a supporting plate 26 which is free to rotate with the shaft 16 and is mounted thereon by gimbals 29 so that plates 24 and 26 can tilt as a unit. Motion is thus transmitted from the pilot's control stick through the control rods 20 and 22, plates 24 and 26 and push rod 28 to raise or lower the linkage 30 around the pivot 31 and thereby raise or lower the connecting rod 32 which operates the control horn 34 to provide cyclic pitch variation. All the foregoing is clearly shown and is more clearly described in Patent No. 2,517,509 mentioned above.

In Fig. 3 is shown a typical cross section of a rotor blade having a spar 60 located near the quarter chord point from the leading edge which has a mass 64 distributed along the length of the blade in order to balance the blades around the feathering axis which may be the centerline of the spar 60. A trailing edge cable 68 is supported by formable metallic clips 66 carried by ribs 62 which may be bent to change the aerodynamic pitching moment of the rotor blade as required.

Fig. 4 shows a proving device which forms a feature of this invention. It consists of an inner push rod 42 which is cut out to form a long mandrel 44, and to which is riveted an outer casing 46. Springs 50 and 52 are mounted within the casing 46 and yieldingly support a hollow rod 48 by its flange 54. A knurled knob 56 with a threaded portion 58 screws into the lower part of the casing 46 and provides a take up adjustment for the springs 50 and 52. The lower portion of the casing 46 is split at 56a and has a simple clamping nut mounted on ears 59 which can lock the knob 56. As shown in this figure, the relative motion axially between the hollow rod 48 and the push rod 42 is prevented by a locking pin 57. Therefore, when the pin 57 is engaged the whole assembly 32 becomes equivalent to a solid push-pull rod and the horn 34 is rigidly linked to the control system. When the pin 57 is removed the horn 34 is yieldingly linked to the control system.

In operating the instant device the presently preferred method is to lock the plates 24 and 26 against angular movement with respect to the shaft 16 by inserting a block at some convenient point, or else locking the control stick in the pilot's cabin in some known manner. The tip path of the several rotor blades is then brought into a common plane by taking up on the rod ends 40 or in any other suitable location to adjust the blade pitch. This procedure of tracking the blades of a rotor so that all the blade tips lie in the same plane when rotated is more fully described in Patent No. 2,552,739, referred to above. When the blades are all in perfect track, i. e., the tips of all the blades pass the tracking flag at the same height, next the pin 57 is removed from each proving device 32 which is in control of the pitch of every blade. Each blade is then free to change its incidence a slight but measurable amount as allowed by the compression of springs 50 and 52. Any increase in the incidence of a blade due to a pitching moment of that blade will result in increased lift of that blade which will cause its tip to rise; whereas any decrease in blade incidence will result in decreased lift which will cause the blade tip to fall. By measuring the height of the tip of all blades above the ground, by observing colored chalk marks wiped from each blade tip by a tracking flag 72 held on a mast 70, the direction and magnitude of the aerodynamic pitching moments of the blades may be easily ascertained. The location of springs 50 and 52 is so designed that the torque of each blade about its feathering axis is manifest as a force compressing the springs in the push rod. Since the spring constants of the springs in the push rod controlling the blades are identical, a like force on each rod would deflect each spring a like distance.

In actual operation the blades of the helicopter may be checked for track and have their pitch adjusted by successive trials until all the blades track perfectly at, for example, 8 degree blade angle and 2000 R. P. M. of the engine, the pitch adjustment being obtained by adjusting the rod ends 40. The locking pins 57 in the push rods, corresponding to their respective blades are then removed allowing the springs to become operative. A tracking record is made with the tracking flag 72 at 2000 R. P. M. of the engine and 8 degrees of the blade angle. The geometry of the blades is then changed, i. e. the trailing edge of the blades which track high on the flag 72 may then be adjusted in a downward direction by bending the clips 66, Fig. 3, while the trailing edge of the blades which track low are adjusted in an upward direction.

With a little experience a skilled operator will be able to tell the amount of trailing edge deflection which must be applied to a blade in order to correct the amount of aerodynamic pitching moment indicated by the colored mark that each blade leaves on the tracking flag. Many times one adjustment is sufficient to remove all objectionable vibration of the control stick at the given angle of blade pitch chosen.

When the proper adjustments have been made, the rotor will be in perfect track with the pins 57 removed showing that the blades are balanced aerodynamically. When the tracking flag shows that the blades are in good track the pins 57 are replaced, the controls are unlocked, and a check run is made at high blade angle. If the adjustments have all been made properly the control stick will remain quite still when held freely under all conditions of power, i. e., R. P. M. and through the full range of blade angle change.

Once an aircraft is away from the factory and some blade damage has upset the aerodynamic balance, this procedure will enable the operator to smooth out all the first order stick vibrations without special instrumentation. However, the chances are that once adjustments have been made on the trailing edge of all the blades of a rotor system, those blades may be interchanged as a set with another set, but will not be interchangeable as individual blades with a blade from another set.

If one blade on a set is so severely damaged that it is no longer of use, it is then desirable to replace it with a new blade. The operator of the helicopter should not have need to purchase three blades because one has been damaged. The new blade must then necessarily be interchangeable with the damaged one, assuming that the other blades in the original set have not been tampered with in any way.

Such interchangeability of individual blades has never been achieved in previous practice but has now been made possible by the application of the following method in the production of rotor blades. This same method, with obvious modifications, may be applied to blades of many different constructions. The present description deals with fabric covered blades built around a round tubular spar, but will be equally applicable to all-plywood blades or all-metal blades, or any combination of the foregoing.

The method and mechanism described above in the preferred embodiment is for use in the field, where laboratory equipment is not available, and will produce results which are of reasonable accuracy. For interchangeability it is in all cases desirable to have a very accurate evaluation of both the dynamic and aerodynamic pitching moments of every blade produced. This accurate evaluation can be done in several ways, including hydraulic, penumatic, electric, or combined methods, of which only the electrical modification is shown.

In the manufacture of any type of rotor blades it has not been found difficult to maintain the chordwise mass balance of production blades so that their dynamic pitching moment, due to the mass being rotated at an angle to the plane of rotation, will be constant between blades. However, it is very much more difficult to maintain the profile section of the blades exactly equal. Any variation in the external contour of the blades built to normal manufacturing tolerances of plus or minus 1/64 of an inch for example will cause a difference of areodynamic moments. If this manufacturing error occurs near the tip of the blades the change of aerodynamic moment will be influenced to a greater degree than if the error occurs near the root end of the blade. This is due to the greater velocity of the tip in its rotative path.

In the test stand procedure to be described below, the blades are run on a rotor head similar to the rotor head of the actual flight model, and similar to the rotor head described above. A more complete description of this rotor head will be found in Patent No. 2,529,635, issued November 14, 1950, to E. F. Katzenberger.

Referring now particularly to Figs. 5 and 8 the blades 18 are mounted on a rotor head 79 which is driven by a shaft 81 from a motor 85 located in a test stand 100. The blades 18 are connected to the rotor head by a flapping link 80' which is attached to the blade by a vertical pivot 82 and to the rotor head by a horizontal pivot 80, thus providing a universal connection between the rotor hub and each blade. To mount a blade on the test stand 100 it is only necessary to disconnect the blade at its root fitting 83 and to connect it to the corresponding root fitting on the test stand. In the rotor test stand shown in Fig. 5, only one blade connection will be described but it is to be understood that a number of blades may be accommodated (Fig. 8) so that the structure described will be the same for each blade. Rods 92 and 94 support and positionally control a plate 90 which surrounds the shaft 81 but is prevented from rotating with the shaft by a scissors 96. By suitable bearings, the plate 90 is connected to plate 88 which is mounted for rotation with the shaft 81 and may be moved axially thereon. In this particular instance, although the control system is identical to the one described above, the control rods 92 and 94 are arranged to control only for axial movement of plate 88, and are prevented from tilting the assembly, so that no cyclic pitch may be imposed. The plate 88 is connected by an axially adjustable rod 86, similar to rod 28 of Fig. 1, to the control horn 84. Movement of the control horn 84 around an axis 83' by changing the length of rod 86 will change the pitch of the blade 18.

Interposed between the two ends of the control rod 86 is a round steel member, herein a ring 87, known as a proving ring. This steel ring is a carefully machined and calibrated ring which will allow microscopic deflections due to any compression or tension loads imposed on rod 86. In order to measure these loads, strain gauges 101, 102, 103 and 104 are mounted in pairs on each side of this ring. These strain gauges may be of the type disclosed in the Simmons Patent No. 2,344,647, issued March 21, 1944. The strain gauges are wired to a source of alternating current 106 and 107 and connected in a bridge circuit shown more clearly in Fig. 6, and are connected by wires 108 and 109 to a recording instrument 112. In order that the current may be supplied to the strain gauges, and that electrical impulses may be passed to the recorder, slip rings 117 are interposed between plates 88 and 90. These slip rings are more fully described in Patent No. 2,473,147, issued June 14, 1949, to H. T. Jensen.

Also incorporated in the electrical hookup is the system disclosed in Fig. 7. On the drive shaft 81 is mounted a plate 116 which turns cam projections 118, one of which is shown in engagement with a breaker switch generally indicated at 120. The breaker switch 120 engages three times in each revolution of the rotor for a three bladed rotor at the time that the rotor control rods 86 including the rings 87 of the several blades 18 are in registry with the control rod 94. At the time of engagement of the switch 120 the force in the control rod 94 due to the action of a rotor blade will be reflected in a strain gauge 146, or the like, which registers the strain in rod 94. Wires from the breaker switch 120 and strain gauge 146 lead to a suitable recorder 125 which may carry a chart 126. Current for the circuits to the breaker switch 120 and the strain gauge 146 are supplied from suitable sources, not shown, through wires 128. The breaker switch 120 may energize a spring biased solenoid 130, or the like, to move a stylus 132 to make a mark 134 on the chart 126. Peaks 136 on the mark 134 will occur 120 degrees apart upon energization of the solenoid 130 by the breaker switch 120 under the influence of the cams 118. In actual practice only one peak may be needed per revolution to orient trace 142. Cams 118 may be of different shape to identify different blades.

To obtain a trace upon chart 126, of the force caused by the blade action, the strain gauge 146 may operate a solenoid 140, or the like, to make a mark 142 upon chart 126. The mark 142 will accurately indicate upon the chart the resultant unbalanced force, which rotates with the blades, as it produces a force upon control rod 94. It will be evident that as the contacts of the breaker switch 120 are closed periodically by cam projections 118 current will flow momentarily in solenoid 130 which will cause the stylus to move and register peaks 136 in the continuous mark 134. Also the variations in strain in rod 94 will cause the electrical resistance of the strain gauge 146 to vary and will similarly vary the current in solenoid 140 which will move its stylus and record the unbalanced load as mark 142 on the chart 126.

This application discloses subject matter which is disclosed and claimed in a copending application of Anton R. Hoffman and Walter J. Crump, Serial No. 644,016, filed January 29, 1946, now Patent No. 2,630,709, and assigned to the assignee of this application.

In combination with the above recording equipment, a similar type recorder 112 with a stylus 110 operated by a solenoid 115 makes a trace 114 on a rotating chart 111. This records the actual direction and magnitude of the total pitching moment of one blades as it tends to deflect the ring 87. A separate recorder and a separate circuit is used for every blade in the rotor, so that if there are three blades on the test stand, there will be three recorders similar to 112 and one recorder similar to 125. With such a system, simultaneous records may be obtained of the total pitching moment which occurs in each blade of the system, and the total vectorial unbalance of the whole system on separate, but coordinated, charts.

The procedure for operating a test stand for a three bladed rotor is as follows:

*Operating procedure*

An operator may perform the following operation to obtain substantially identically balanced and uniformly operative rotor blades:

(1) Inspect the air vent hole 71 on the lower surface of each blade. All vent holes must be equal to have the same fabric deflection on each blade. (This is unnecessary on all-plywood or all-metal blades.)

(a) Use a standard reamer in each hole for accurate sizing.

(b) Sand the edges of the hole to eliminate any burrs that may exist. This prevents the airstream from being deflected into the vent hole.

(2) Install three blades on the test stand 100.

(3) Adjust the blade angle for perfect tracking at, for example, 10° blade angle and 2000 R. P. M. of engine by use of the tracking flag 72. On a test stand installation, such as shown in Fig. 5, the flag 72 on shaft 70 may be rotated on a pivot 76 which is secured to the ground against a stop 74. The stop 74 will prevent the flag 72 from entering too far into the rotative path of the blades and thereby damaging them.

(4) When the blades are in perfect track, record the pitching moment of each blade separately on the three strain-gauge recorders 112. Also record the unbalance on the direct writing recorder 125.

(5) To balance the pitching moments of the three blades, a very small tab-effect at the trailing edge is impressed on the required blade or blades by bending the trailing clips 66. A deflection of the trailing edge downward will increase the pitch-decreasing moment, and a deflection of the trailing edge upward will diminish the pitch-decreasing moment or increase the pitch-increasing moment. A mechanism such as described in Patent No. 2,422,042, issued June 10, 1947, to Reon B. Roberts may be used conveniently for this operation.

(6) Repeat Item #3 above.

(7) Repeat Item #4 above.

(8) If the pitching moments of all three blades are equal, and the recorder 125 shows that the readable (if any) unbalance is at a satisfactory minimum, the blades have balanced pitching moments and will fly satisfactorily.

(9) If the pitching moments are not balanced, repeat Item #5, Item #3, and Item #4 until balanced pitching moments are obtained.

Obviously if all production blades are run against a set of 2 master blades, for a three bladed rotor after processing as above, each blade will have the same pitching moment. Of course it is necessary to keep the total weight between blades the same as well as a uniform location of the center of gravity both spanwise and chordwise. Under normal manufacturing methods these weight requirements may be maintained without great difficulty. The dynamic pitching moments due to any weight unbalance will be immediately apparent if a plot is made of the data of pitching moment vs. blade angle of each blade as taken from the strain gauge recorders and those blades having too great a chordwise unbalance may be rejected or sent back to the shop for rework. The inequalities which will remain will then be the aerodynamic pitching moments due to the inequalities of surface contour between blades. These may be taken care of by the method described herein.

It is to be understood that the invention is not limited to the specific embodiment herein illustrated and described, but may be used in other ways without departure from its spirit as defined by the following claims.

What we claim is:

1. In a device for testing helicopter blades, a power driven hub having means for mounting a blade thereon for pitch changing movement about the longitudinal axis of the blade, a control member having an operative connection with a blade on said hub eccentrically of the pitch changing axis of the blade, resilient means comprising a ring-like member in the operative connection between said member and the blade enabling the blade to pivot about its pitch changing axis an amount proportional to its aerodynamic pitching moment when the blade is rotated by said hub, and means responsive to the distortion of said ring-like member for recording the aerodynamic pitching moment of the rotating blade.

2. In a device for testing rotor blades, a power driven hub having means thereon for mounting a rotor blade for pitch changing movement about the longitudinal axis of said blade, a control member having an operative connection with said blade eccentrically of the pitch changing axis of the blade, said connection including a proving element rotatable with said blade which is more resilient than the rest of said connection and in which the deflection due to the pitching moment in said blade is concentrated when the latter is rotated by said hub, and means responsive to the deflection of said element for indicating the pitching moment of the rotating blade.

3. In a device for testing rotor blades, a power driven hub having means thereon for mounting a rotor blade for pitch changing movement about the longitudinal axis of said blade, control mechanism for varying the pitch of said blade including a swashplate having rotatable and non-rotatable elements and linkage means operatively connecting the rotatable element of said swashplate with said blade eccentrically of the pitch changing axis thereof, said control mechanism including a proving element in the rotating portion of said linkage means which is more resilient than the rest of said mechanism and in which the strain in said pitch control mechanism due to the pitching moment present in the blade is localized, and means responsive to the deformation of said proving element as the latter rotates with said blade for indicating the pitching moment of the rotating blade.

4. In a device for testing helicopter blades, a power driven hub having means thereon for mounting a helicopter blade for coning movement and for pitch changing movement about its longitudinal axis, a control member having an operative connection with the blade eccentrically of its pitch changing axis, resilient means in the connection between said member and the blade comprising a ring-like member enabling the blade when rotated to pivot about its pitch changing axis an amount proportional to its aerodynamic pitching moment, electrical means responsive to deflections of said ring-like member due to the pitching moment of the blade when the latter is rotated by said hub including a plurality of strain gauges mounted on said ring-like member, and means controlled by said electrical means for recording said moment.

5. In combination, a rotatable hub having means thereon for mounting a rotor blade for pitch changing movement about the longitudinal axis of said blade, control mechanism for varying the pitch of said blade including a swashplate having rotatable and non-rotatable elements, linkage means connecting the rotatable element of said swashplate with said blade eccentrically of the axis of the latter including a calibrated proving element in said linkage means which is more resilient than the rest of said control mechanism and in which the deformation of said mechanism due to the pitching moment of the blade is concentrated when the latter is rotated by the hub, electrical means rotatable with and responsive to the deformation of said proving element, means stationary relative to the rotatable hub for recording the response of said electrical means as a measure of the pitching moment of said blade, and means for electrically connecting said rotating electrical means and said non-rotating recording means including electrical slip ring means.

6. In a device for testing rotor blades, a power driven hub having means thereon for mounting a master blade and a blade to be matched to said master blade for pitch changing movement about the longitudinal axes thereof, control mechanism for varying the pitch of said blades including a swashplate having rotatable and non-rotatable elements and separate linkage means operatively connecting the rotatable element of said swashplate with each of said blades eccentrically of the pitch changing axis thereof, each linkage means including a calibrated proving element which is more resilient than the rest of said control mechanism and in which the deformation of said mechanism due to the pitching moment of the associated blade is concentrated when the latter is rotated by the hub, electrical means responsive to the deformation of each of said proving elements, and means stationary relative to said hub and electrically connected with said electrical means for simultaneously indicating the response of each of said electrical means as a measure of the pitching moment of each of said blades.

7. The method of producing balanced and interchangeable production blades for rotary wing aircraft having adjustable pitch setting mechanism comprising the steps of, rotating a blade to be balanced and a master blade together while both blades are held at a predetermined pitch angle, adjusting the pitch of said production blade until it has the same lift as said master blade and hence tracks with said master blade, rotating said in-track blades and simultaneously measuring the direction and magnitude of the pitch changing moment of each blade, and adjusting the aerodynamic contour of said production blade as indicated necessary by said measurements until the pitch changing moment of said production blade is of the same direction and magnitude as that of said master blade.

8. The method of balancing the several blades of a rotary wing aircraft having adjustable pitch setting mechanism comprising the steps of, rotating the blades with all the blades held at a predetermined pitch angle, adjusting the pitch of said blades until they all have the same lift and hence all track with each other, rotating said in-track blades and, while they are rotating, measuring the direction and magnitude of the pitch changing moment of each blade, and adjusting the aerodynamic contour of said blades as indicated necessary by said measurements to bring the pitch changing moments of said blades into agreement both in direction and magnitude.

HARRY T. JENSEN.
HORACE W. BONNETT.

References Cited in the file of this patent

UNITED STATES PATENTS

| Number | Name | Date |
|---|---|---|
| 1,990,291 | Larsen | Feb. 5, 1935 |
| 2,045,623 | Wilford | June 30, 1936 |
| 2,150,129 | Pecker | Mar. 7, 1939 |
| 2,252,464 | Kearns, Jr., et al. | Aug. 12, 1941 |
| 2,265,366 | Hafner | Dec. 9, 1941 |
| 2,343,383 | Martin et al. | Mar. 7, 1944 |
| 2,344,642 | Ruge | Mar. 21, 1944 |
| 2,380,581 | Prewitt | July 31, 1945 |
| 2,380,582 | Cierva | July 31, 1945 |
| 2,385,881 | Peterson | Oct. 2, 1945 |
| 2,393,669 | Wheaton et al. | Jan. 29, 1946 |
| 2,394,766 | Halford | Feb. 12, 1946 |
| 2,451,541 | Doman | Oct. 19, 1948 |
| 2,455,053 | Flint | Nov. 30, 1948 |
| 2,552,739 | Roberts | May 15, 1951 |